F. HOPPKE.
PASTRY CUP.
APPLICATION FILED SEPT. 20, 1915.
1,184,956. Patented May 30, 1916.
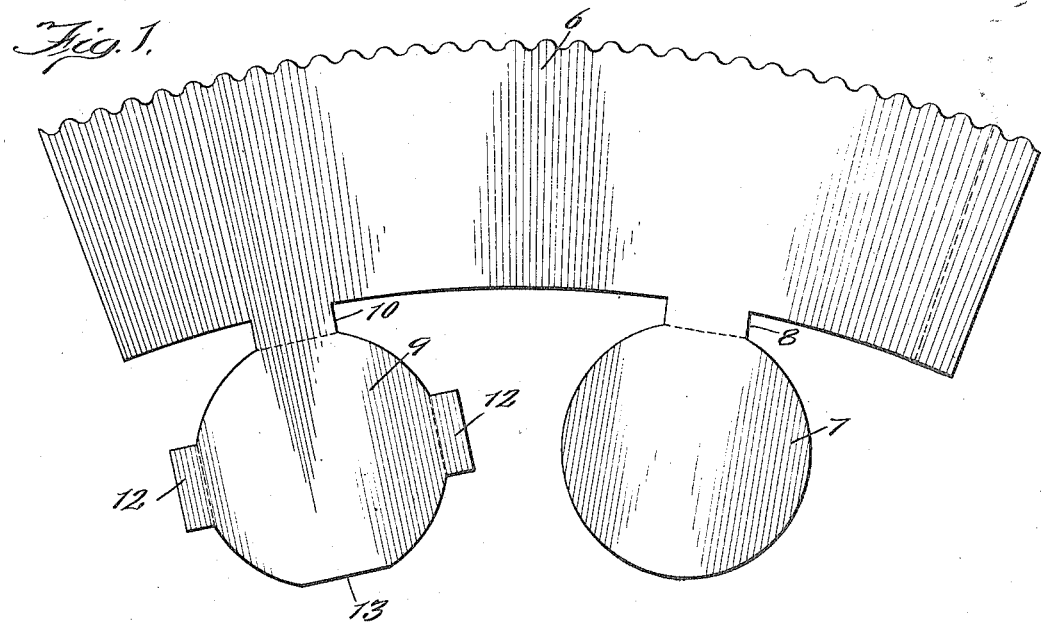
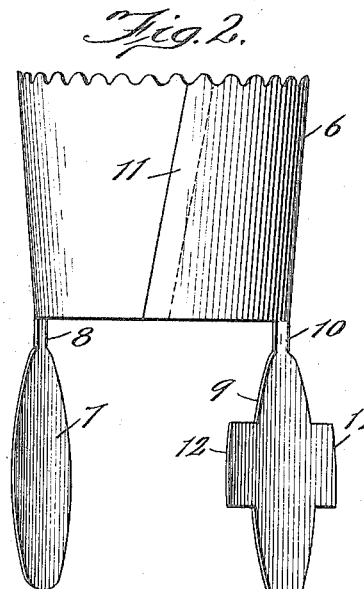
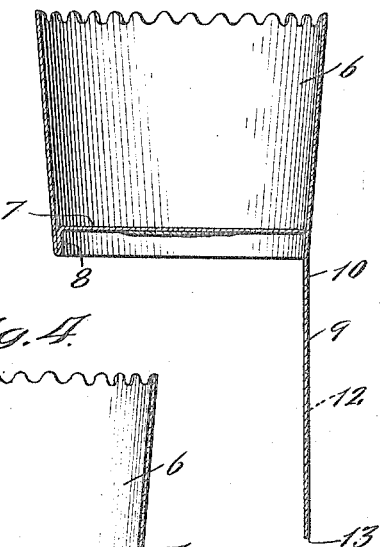
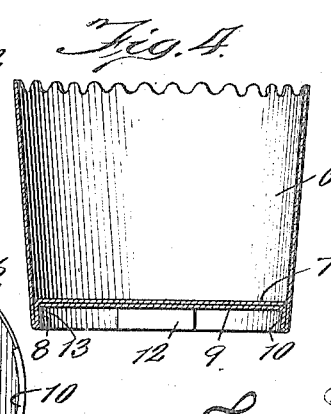
Witnesses:
Inventor: Frederick Hoppke

UNITED STATES PATENT OFFICE.

FREDERICK HOPPKE, OF CHICAGO, ILLINOIS, ASSIGNOR TO LANZIT PAPER PAIL COMPANY, OF CHICAGO, ILLINOIS, A CORPORATION OF ILLINOIS.

PASTRY-CUP.

1,184,956.

Specification of Letters Patent.

Patented May 30, 1916.

Application filed September 20, 1915. Serial No. 51,555.

*To all whom it may concern:*

Be it known that I, FREDERICK HOPPKE, a citizen of the United States, residing at Chicago, in the county of Cook and State of Illinois, have invented certain new and useful Improvements in Pastry-Cups, of which the following is a specification.

This invention relates to improvements in pastry cups and its object is to provide a paper receptacle of strong and substantial construction, which can be manufactured at low cost and is especially adapted for holding charlotte russe.

Heretofore it has been customary to make these cups in two parts, one comprising the tapered shell and the other comprising the bottom which is formed with a peripheral flange and is forced within the shell to the small end thereof. In practice the bottoms often fall out of the shells in shipment and in handling and claims for allowances on the purchase price are constantly being made for this reason. The bottoms also fall out frequently when the pastry is inserted in the cup and sometimes thereafter, entailing loss of the pastry as well as the cup.

My invention has for its object to provide a pastry cup with a bottom which is securely and rigidly fastened within the shell so that it will not become displaced from the shell accidentally and will not be forced out of the shell when the pastry is inserted in the cup or during subsequent use of the cup.

A further object of the invention is to provide a pastry cup which can be formed out of a single sheet of cardboard and having integrally attached bottom disks adapted to be arranged one upon the other within the shell and glued together to form a permanent bottom for the cup.

On the accompanying drawings illustrating a preferred form of the invention Figure 1 is a plan view of the blank; Fig. 2 is an elevation showing the first operation of forming the cup, the ends of the shell member being fastened together to form the shell; Fig. 3 is a sectional view showing the next operation, the upper member of the bottom being arranged in place in the shell; Fig. 4 is a sectional view showing the bottom in place, and Fig. 5 is a bottom plan view of the cup.

Referring to the drawings, the blank comprises a segmental shell member 6 of suitable size, an upper bottom member 7 attached to the shell member by a neck 8, and a lower bottom member 9, also attached to the shell member by a neck 10. The two bottom members are connected to the lower edge of the shell member and are spaced apart so that their necks 8 and 10 will be located diametrically opposite each other when the ends of the shell member are overlapped and glued together, as shown at 11 (Fig. 2). The bottom member 9 is provided with oppositely disposed projections 12 and its edge diametrically opposite the neck 10 is preferably cut away or straightened at 13 to accommodate the neck 8 of the bottom member 7 and facilitate insertion of the bottom member 9.

In practice the ends of the shell member are glued together to form a conical shell, as shown in Fig. 2. Then the upper bottom member 7 is forced into the shell through the lower end thereof, the neck 8 folding at its connection with the shell and at its connection with the bottom 7, as shown in Fig. 3. Glue is then applied to the lower face of the member 7 or to the upper face of the member 9 and the latter member is forced into the lower end of the shell against and into contact with the upper member 7, the neck 10 folding at its connection with the shell and also at its connection with the member 9. The two bottom members are secured together by glue, as before mentioned, or in any other suitable manner, and they are permanently held within the shell at the lower end thereof by reason of the fact that they are made fast to each other and also because the necks 8 and 10, connecting them with the shell, are oppositely disposed and folded up alongside of the shell, as shown in Fig. 4. The bottom cannot drop accidentally out of the shell nor can it be forced out without destroying the cup since sufficient force would be required to disrupt the double bottom to enable the connecting necks to swing inward and downward, and even then the necks would suspend the bottom slightly below the shell and prevent loss of the contents of the cup. The projections 12 on the lower member 9 are arranged to fold at their connection with said member to form legs which are located close to the shell beneath the bottom and engage the surface upon which the shell rests to prevent the bottom of the cup from being pushed out of the shell when the cup is being filled or at any other time.

My invention provides a pastry cup of strong and substantial construction which can be manufactured rapidly in large quantities without unnecessary waste of material and at low cost. The construction is such that the cup can be readily and quickly made from the blank.

It is customary to connect the ends of the shell member by glue or otherwise and to insert the bottom after the glue on the shell member has dried. It often happens that the ends of the shell member are broken apart during the insertion of the bottom member, especially when the shell member has been made too small and considerable pressure is required to force the bottom member into proper position therein. But with my invention there is little, if any, liability of breaking apart the ends of the shell member by inserting the bottom members therein because there is no necessity for employing any material force or pressure since the bottom is not wedged in the shell as in the cups of the prior art with which I am familiar. The construction of my invention is such that instead of the bottom constantly exerting an outward pressure within the shell, having a tendency to break the ends of the shell member apart, the bottom member just fits within the shell and really has a tendency to hold the shell in shape since it is connected by the diametrically opposite necks 8 and 10 with the lower edge of the shell and on opposite sides of the joint 11 of the ends of the shell member.

I claim:

A pastry cup comprising a segmental member having its opposite ends adhesively secured together to form a shell, two bottom members arranged to fit within said shell at the lower end thereof and adhesively secured together, necks integrally connecting said bottom members with the shell, said necks being located within said shell diametrically opposite each other, and oppositely disposed legs on one of said bottom members and lying adjacent said shell below said bottom member to form a support therefor.

FREDERICK HOPPKE.

Witnesses:
 ERNEST H. MERCHANT,
 W. T. WESTERBERG.